June 22, 1965  B. P. BLASINGAME  3,190,121
GRAVIMETER
Filed Jan. 19, 1962  3 Sheets-Sheet 1

Benjamin P. Blasingame
INVENTOR.

June 22, 1965  B. P. BLASINGAME  3,190,121
GRAVIMETER

Filed Jan. 19, 1962  3 Sheets-Sheet 2

Benjamin P. Blasingame
INVENTOR.

BY

June 22, 1965    B. P. BLASINGAME    3,190,121
GRAVIMETER
Filed Jan. 19, 1962    3 Sheets-Sheet 3
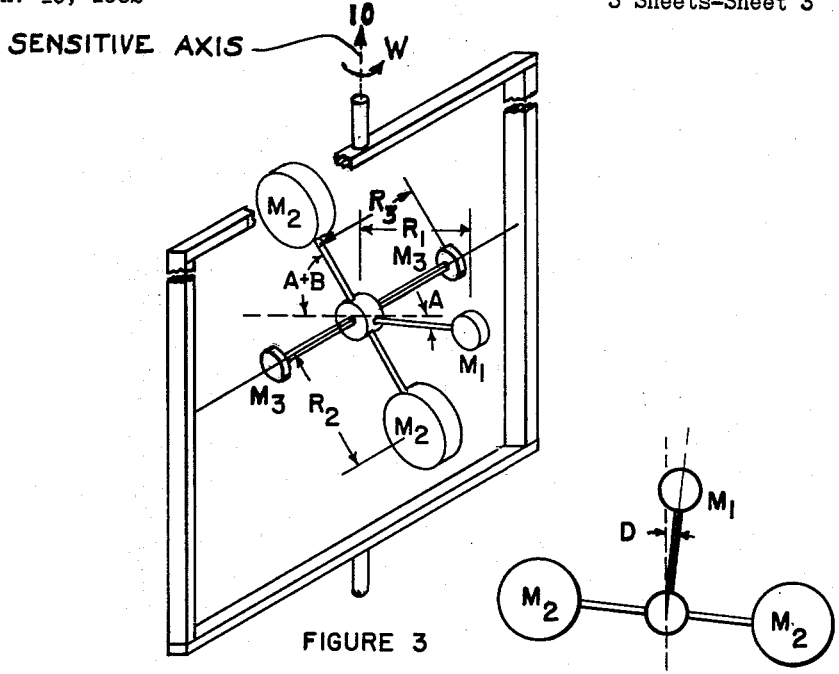
FIGURE 3
FIGURE 5
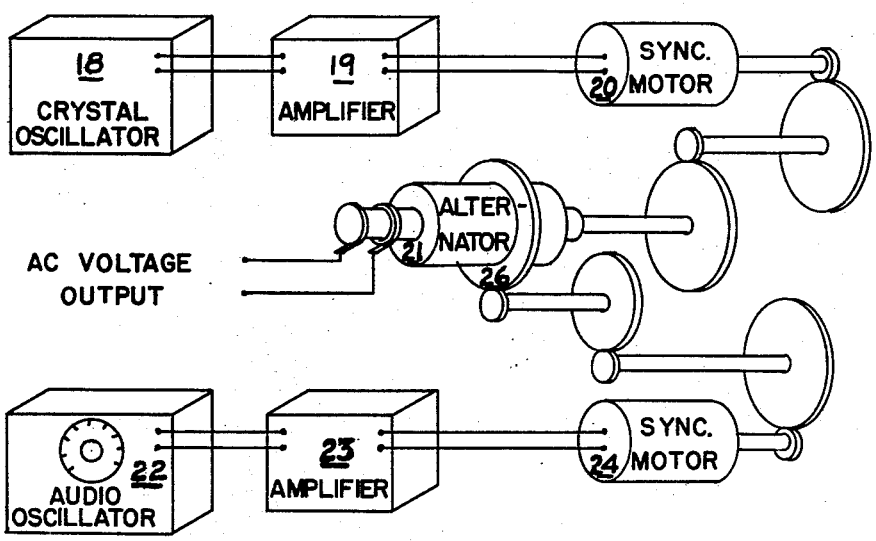
FIGURE 4
Benjamin P. Blasingame
INVENTOR.
BY

United States Patent Office 3,190,121
Patented June 22, 1965

3,190,121
GRAVIMETER
Benjamin P. Blasingame, 2621 E. Menlo Blvd.,
Milwaukee, Wis.
Filed Jan. 19, 1962, Ser. No. 167,451
4 Claims. (Cl. 73—382)
(Granted under Title 35, U.S. Code (1952), sec. 266)

The invention described herein may be manufactured and used by or for the United States Government for governmental purposes without payment to me of any royalty thereon.

The invention described herein pertains to the precise measurement of the force or acceleration of gravity. It belongs to a large class of instruments know as gravimeters.

The acceleration of gravity has long been measured by observing the period of oscillation of pendulums made of Invar or other material which has a very low coefficient of thermal expansion. With reasonable control of temperature, very precise measurements of gravity, one part in a million for example, can be made by observing these pendulums over a very long time. For field use, however, pendulums have been replaced by calibrated sensitive spring scale devices. Many variations in these devices exist; all are aimed at increasing sensitivity, total dynamic range, portability, quickness of reading, and so on. In all these devices, the basic means is some sort of carefully calibrated combination of a mass and spring suspension system.

An object of this invention is to provide a hermetically sealed instrument for the measurement of the acceleration of gravity with remote electrical indication of the force of gravity so that measurements may be made in inaccessible locations such as under water or in deep wells.

Another object of this invention is to provide an instrument for the measurement of the acceleration of gravity of unusual sensitivity over a greatly extended total dynamic range.

Another object of this invention is to provide an instrument for the measurement of the acceleration of gravity of unusually rugged design so that it is readily portable and adapted to extended use in the field with infrequent recalibration.

Still another object of this invention is to provide a gravimeter in which the gravitational acceleration is inferred from the frequency of an alternating voltage since means for measurement of frequency to great precision are readily available.

The device of this invention differs fundamentally from the spring scale class of instruments in that it is a force or torque balance in which a torque caused by the acceleration of gravity is balanced by a torque caused by centrifugal acceleration. The centrifugal acceleration is generated by rotation of the assembly by an electric motor locked synchronously with the driving alternating current. In this way, the measurement of gravity is reduced to a measurement of the frequency of an alternating voltage. Frequency is a rather fundamental quantity and means for its measurement to great precision are readily available as commercial instruments. Reliance upon calibrated spring suspension is completely eliminated; the calibration is dependent only upon the relative geometry of the sensitive element which, in turn, is essentially independent of temperature.

In the preferred embodiment, the sensitive element consists of one asymmetric pendulum and a pair of pendulums in a symmetric configuration fixed together and arranged to rotate about a common axis which is restrained by a pair of torsion wires. Actually, this pendulum assembly is an integral part of a float which is floated at near neutral buoyancy in a high density fluid. This entire assembly is arranged so that it may be rotated about an axis normal to the aforementioned pendulum axis, hereinafter called the sensitive axis, at a precisely known rotational speed.

An electrical signal generator which indicates deflection of the pendulum assembly away from its null position is an integral part of the inner pendulum assembly. The null indication signal from this signal generator is brought out through slip rings on the sensitive axis. A heater and thermostat are provided to maintain the entire system at a somewhat uniform temperature. Thus, the only connections to the sensitive element are electrical. The unit is hermetically sealed and no access for observation is required. The unit may be operated remotely as under the sea or in inaccessible wells being connected to the auxiliary equipment by electrical cabling only.

The sensitive element is driven by a hysteresis motor. This type of motor possesses the characteristic that it is self synchronizing with the frequency of the applied alternating voltage. Thus, the frequency applied to the motor is a precise measure of the speed of the sensitive element.

The device is arranged so that the gravitational acceleration acts on the asymmetrical pendulum causing a torque tending to rotate the pendulum assembly about the pendulum axis. The centrifugal acceleration due to the rotation of the pendulum about the sensitive axis acts on the symmetric pendulums causing a torque balancing the torque due to gravity acting on the asymmetric pendulum. Should these two torques be unbalanced by an increase in the gravitational force, for example, the pendulum assembly rotates away from its null position and this displacement is indicated by an electrical signal from the signal generator. To restore the balance and return the pendulum assembly to the null position, the driving frequency is increased which in turn increases the centrifugal torque couple. The increase in frequency necessary to restore balance is related precisely to the increase in gravity.

The system may be made automatic by a servomechanism arranged to adjust the frequency to reduce the output electrical signal to null. In a more simple device this function may be performed by a human operator.

Other features and constructional details will become apparent from the following descriptions when read in connection with the accompanying figures, wherein:

FIGURE 3 is a schematic of the sensitive element used to derive the equations indicating the operation and sensitivity of the instrument;

FIGURE 4 is a schematic of an arrangement for generating alternating voltages of precisely known frequency; and FIGURE 5 is a schematic of an alternative embodiment of the invention.

The terms force and acceleration are used almost interchangeably herein. By Newton's law, $F=ma$, it is clear that acceleration is simply the force per unit mass. Thus, we may speak of the force per unit mass exerted by gravity or more simply, the acceleration of gravity. The acceleration of gravity, $g$, varies systematically with latitude between about 983 and 978 cm./sec.$^2$ from pole to equator and randomly due to mountains and oceans and variations in the density of the earth.

Referring to the pictorial schematic of the sensitive element as shown in FIGURE 3, the general scheme of mechanization is described in the following. With the sensitive axis vertical, gravity acting on the unsymmetric mass, $M_1$ exerts a torque on the central pendulous assembly. This torque is counteracted by the torque resulting from the centrifugal forces due to the rotational rate, $W$, acting on the two symmetric masses, $M_2$. Precise balance of these two torques is attained by adjustment of the rotational speed, $W$, so that the arm mounting the mass $M_1$, is maintained exactly perpendicular to the sensitive axis. Under these conditions, the rotational speed, $W$, is related to the local value of the force of gravity. The rotational speed, $W$, may be readily controlled and known to great precision.

Figure 2:
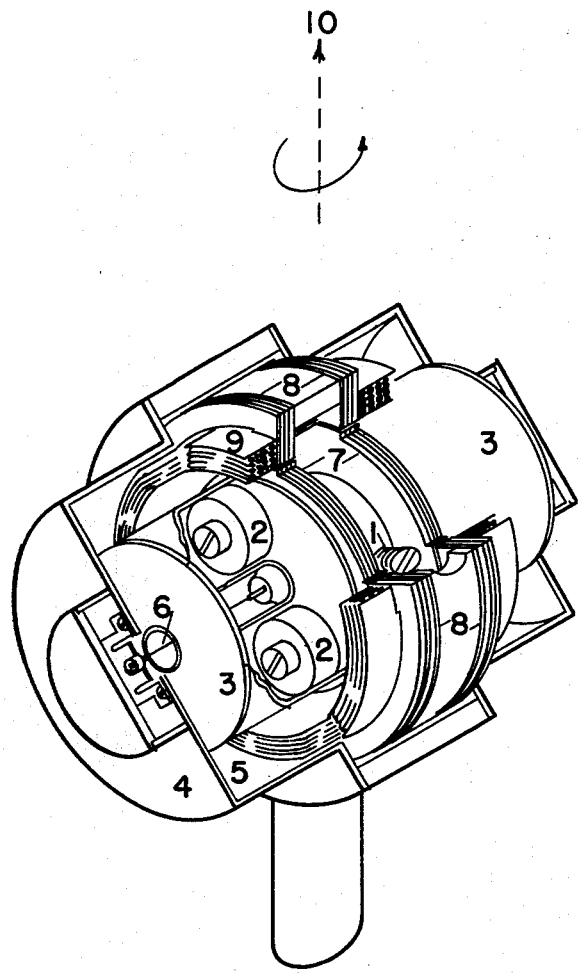
FIGURE 2 is a pictorial assembly sketch of the sensitive element with a section cut away from the outside of the case.

A number of features provide a practical instrument such as is illustrated in FIGURE 2. The first of these is that the central pendulous assembly mounting the unsymmetric mass 1 (shown with adjustable radius for calibration purposes) and the symmetric masses 2 is rigidly attached to or made an integral part of a float assembly 3; the simple gimbal is actually a case 4 surrounding the float, and a dense fluid fills the space 5 between the float and the case. Without this provision, the centrifugal force acting on the unsymmetric mass would cause the entire pendulous assembly to move outward from the sensitive axis 10 distorting the torsion wire 6. However, with the floated assembly just described, arranged so that the pendulous assembly is maintained just slightly lighter than neutral buoyancy, powerful centering forces result from the centrifugal field acting on the floatation fluid causing the pendulous float assembly to be maintained at the exact center of rotation. This floated design causes the suspension to be unaffected by accelerations. Thus, any shock is transmitted through the fluid so that the torsion wires may be made very delicate and yet the instrument is especially rugged.

Another necessary feature provides a means to detect angular displacement of the pendulous assembly so that appropriate adjustment of the rotational speed can be made until the exactly balanced condition is realized. An electrical signal generator or rather conventional design such as a microsyn is used for this purpose. An armature 7 of magnetic material is made an integral part of the pendulous float assembly. The stator 8 of the signal generator with windings 9 which is shown sectioned through two of its poles is fastened to the case and the exciting voltage and output signal are connected through slip rings (not shown) mounted on the sensitive axis 10.

Figure 1:
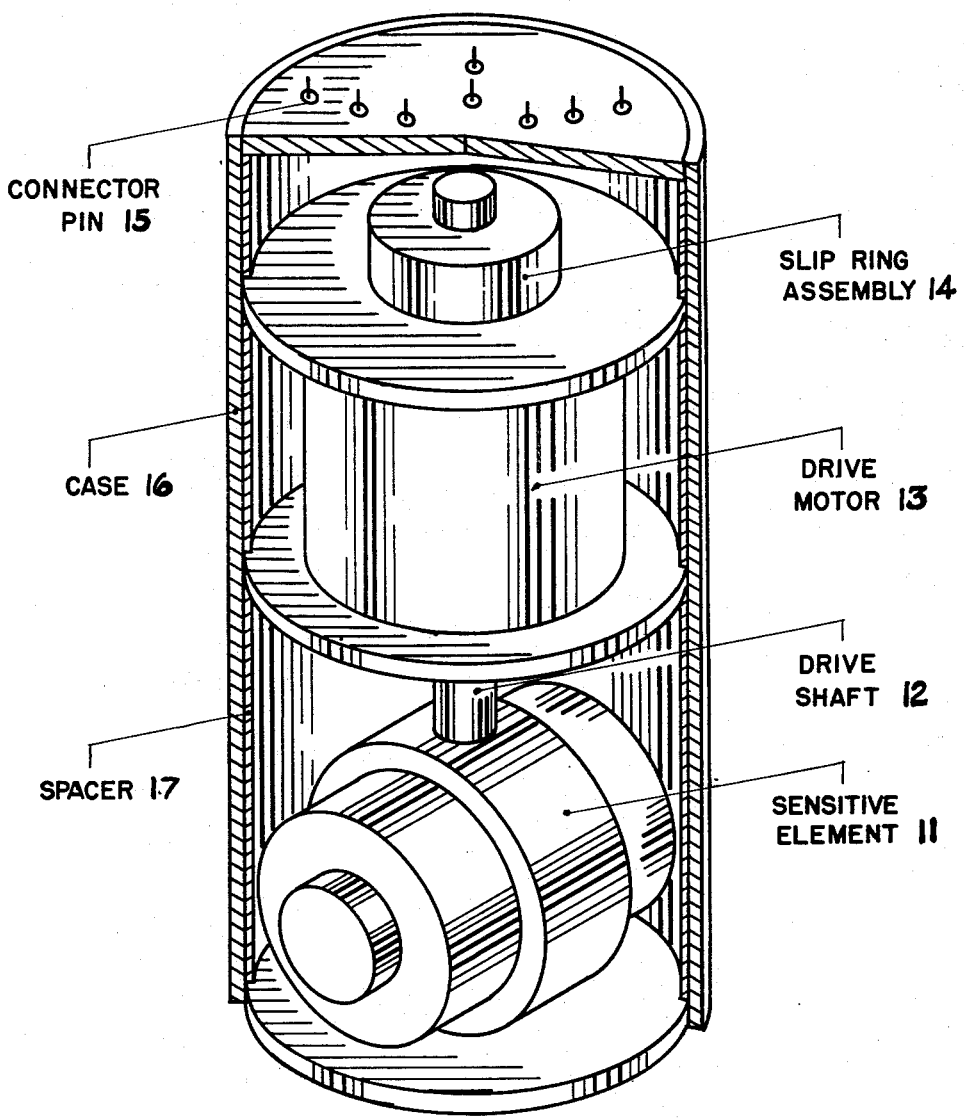
FIGURE 1 is a diagrammatic assembly sketch with a section cut away from the outside case showing the drive motor and the outside of the sensitive element.

The arrangement by which the sensitive element is mounted, rotated, and contacted electrically is shown diagrammatically in FIGURE 1. As shown, the sensitive element 11 is fixed to the shaft 12 of an electrical motor 13. This same shaft 12 carries slip rings to which the coils of the electrical signal generator are connected. The stationary brushes of the slip ring assembly 14 are connected to the pins 15 in the instrument case 16 which has a spacer 17. In addition, connections are provided for the drive motor and an electrical heating element which may be of the film type made a part of the case. The entire instrument case is hermetically sealed and filled with a gas, preferably some inert gas such as helium.

The schematic of FIGURE 3 is used to define the parameters and geometry of the sensitive element. The quantities and their definitions are as follows:

Sensitive axis: An axis perpendicular to the pivot axis of the pendulum and the axis about which the whole assembly is rotated at an angular velocity, $W$.

$W$ = Angular velocity in radians per second.
$M_1$ = Mass of asymmetric pendulum with center of gravity at radius, $R_1$ from pivot axis.
$M_2$ = Mass of each of two pendulums arranged to be symmetrical about the pivot axis (the arms are colinear and the centers of gravity are at radius, $R_2$)
$A$ = Displacement angle in radians between the plane normal to the sensitive axis and the center line of the asymmetric pendulum. The signal generator produces a voltage roughly proportional to this angle.
$B$ = Fixed angle between center lines of the asymmetric and the symmetric pendulums.
$k$ = Spring constant in dyne-centimeters per radian of the torsion wire supports.
$g$ = Local acceleration of gravity in centimeters, per second squared. (Approximately 980 cm./sec.²)

The assembly illustrated in FIGURE 3 also includes "end masses" $M_3$ whose magnitude and radii, $R_3$, are selected so that the assembly is restrained very stiffly from any rotation or "tilt" about an axis perpendicular to both the pendulous axis and the sensitive axis.

In actual use, the instrument is carefully leveled so that the sensitive axis is along the local vertical. In this position, gravity acting on the symmetric pendulum produces no net torque tending to change the angle, $A$, but acting on the asymmetric pendulum does produce a torque tending to increase the deflection angle, $A$. On the other hand, the rotation of the whole assembly about the sensitive axis produces a torque couple due to the symmetric pendulums and a torque due to the asymmetric pendulum, both tending to decrease the deflection angle $A$. In addition, the torsion wire suspension produces a very small torque tending to reduce the deflection angle. Mathematically these torques are:

Torque due to $W$:

$$-2M_2R_2^2W^2 \sin(A+B) \cos(A+B)$$
$$-M_1R_1^2W^2 \sin(A) \cos(A) = -M_2R_2^2W^2 \sin(2A+2B)$$
$$-\frac{M_1R_1^2W^2}{2} \sin(2A) \quad (1)$$

Torque due to gravity, $g$:

$$+M_1R_1g \cos(A) \quad (2)$$

Torque due to torsion wire suspension:

$$-kA \quad (3)$$

By d'Alembert's principle:

$$-M_2R_2^2W^2 \sin(2A+2B) - \frac{M_1R_1^2W^2}{2} \sin(2A)$$
$$+M_1R_1g \cos(A) - kA = 0 \quad (4)$$

The important performance parameters of this instrument are: its sensitivity and its precision or accuracy. The first of these, sensitivity, refers to the ability of the instrument to detect minute changes in the force of gravity. In this instrument, this is the ratio of the incremental change in angle, $A$, caused by an incremental change in $g$, or simply the derivative, $dA/dg$, the rotational speed, $W$, being kept constant. The deflectional angle is detected by the electrical signal generator and, therefore, sensitivity is limited ultimately by the uncertainty or noise level of the signal generator. However, as will be shown, the angular sensitivity of this instrument can be made so great with special arrangement of the symmetric and unsymmetric masses that the signal generator uncertainty does not actually limit the sensitivity of a practical instrument.

The precision or accuracy of the instrument refers to its ability to measure precisely minute changes in the rotational speed, $W$, resulting from minute variations in the force of gravity. Consider that the instrument has been set up and carefully balanced, the rotational speed noted, and the instrument is now moved to a new location having a different value of $g$ and is rebalanced. The accuracy then is fixed by the change in rotational speed resulting from this small change in $g$, or simply the derivative $dW/dg$, the deflection angle being constant at zero.

The actual limitation on precision then is the ability of frequency measuring instruments to measure this speed change.

Considering first the angular sensitivity, equation 4 is differentiated as follows:

$$-M_2R_2^2W^2 \cos(2A+2B)2\frac{dA}{dg} - \frac{M_1R_1^2W^2}{2}\cos(2A)2\frac{dA}{dg}$$

$$-M_1R_1g \sin(A)\frac{dA}{dg} + M_1R_1 \cos(A) - k\frac{dA}{dg} = 0 \quad (5)$$

$$\frac{dA}{dg} = \frac{M_1R_1 \cos(A)}{2M_2R_2^2W^2 \cos(2A+2B) + M_1R_1^2W^2 \cos(2A) + M_1R_1g \sin(A) + k} \quad (6)$$

Substitute:

$$\cos(2A+2B) = \cos 2(A) \cos(2B) - \sin(2A) \sin(2B)$$

$$\frac{dA}{dg} = \frac{\cos(A)}{2\frac{M_2R_2}{M_1R_1}R_2W^2 \cos(2A)\cos(2B) - 2\frac{M_2R_2}{M_1R_1}R_2W^2 \sin(2A)\sin(2B) + R_1W^2\cos(2A) + g\sin(A) + \frac{k}{M_1R_1}} \quad (7)$$

For large sensitivity, the angle, B, may be selected such that:

$$2\frac{M_2R_2}{M_1R_1}R_2 \cos(2B) = -R_1 \quad (8)$$

Then:

$$\frac{dA}{dg} = \frac{\cos(A)}{-2\frac{M_2R_2}{M_1R_1}R_2W^2 \sin(2A)\sin(2B) + g\sin(A) + \frac{k}{M_1R_1}} \quad (9)$$

The device is operated in such a way that the angle, A, is kept very small so that $\sin(A) = A$; $\sin(2A) = 2A$; $\cos(A) = 1$ (approximately).

Then:

$$\frac{dA}{dg} = \frac{1}{\left[g - 4\frac{M_2R_2}{M_1R_1}R_2 \sin(2B) W^2\right]A + \frac{k}{M_1R_1}} \quad (10)$$

By reference to equation 4 it is seen that the nominal value of $W^2$ corresponding to the nominal value of $g$ with $A=0$ is:

$$W^2 = \frac{M_1R_1}{M_2R_2R_2 \sin(2B)}\cdot\frac{1}{g} \quad (11)$$

Therefore (for A very small):

$$\frac{dA}{dg} = \frac{1}{-3gA + \frac{k}{M_1R_1}} \quad (12)$$

Because the coefficient of A is negative, the sensitivity becomes infinite when the angle, A, reaches the value $$\frac{1}{3g}\frac{k}{M_1R_1}$$

radians at which the denominator vanishes. This means that with the rotational speed, W, adjusted to precisely balance the pendulous assembly under some specific value of $g$, and now the value of $g$ is gradually increased, the angle, A, will increase slowly until it reaches the critical value $$\frac{1}{3g}\frac{k}{M_1R_1}$$

at which point it will increase rapidly even without further increase in $g$. By design, the sensitivity at $$A=0, \frac{dA}{dg} = \frac{M_1R_1}{k} \quad (A=0)$$

is made such that this critical value of A is always reached for the desired threshold change in $g$. For example, if a threshold of $g \times 10^{-8}$ is desired, the design parameter $M_1R_1/k$ is made to have a value around 6 as inferred from the following:

For A initially zero:

$$\frac{dA}{dg} = \frac{\Delta A}{\Delta g} = \frac{M_1R_1}{k} \quad (13)$$

$$\Delta A = A \text{ (A initally zero)} = \frac{M_1R_1}{k}\Delta g \quad (14)$$

Also:

$$A = \frac{1}{3g}\frac{k}{M_1R_1} \quad (15)$$

$$\frac{M_1R_1}{k}\Delta g = \frac{1}{3g}\frac{k}{M_1R_1} \quad (16)$$

$$\left(\frac{M_1R_1}{k}\right)^2 = \frac{1}{3g\Delta g} \quad (17)$$

$$\Delta g = g \times 10^{-8}$$

$$g = \text{(approx) } 1000 \text{ cm./sec.}^2$$

$$\left(\frac{M_1R_1}{k}\right)^2 = \frac{10^8}{3g^2} = \frac{10^8}{3 \times 10^6} = 33.3 \quad (18)$$

$$\frac{M_1R_1}{k} = \text{(approx) } 6 \quad (19)$$

The above is illustrative only. The unique feature of this device is that its sensitivity can be made to increase without bound, that is, can be made arbitrarily large. Inasmuch as the angular sensitivity can be made arbitrarily large, the electrical sensitivity (output voltage per $g$) can be made arbitrarily large.

Considering next the angular velocity or frequency discrimination sensitivity, equation 4 is differentiated as follows (the deflection angle, A, being held zero by adjustment of W):

$$-2M_2R_2^2W\frac{dW}{dg}\sin(2B) + M_1R_1 = 0 \quad (20)$$

$$\frac{dW}{dg} = \frac{M_1R_1}{2M_2R_2^2W \sin(2B)} \quad (21)$$

Substituting the nominal value of $W^2$ as indicated by equation 11:

$$\frac{dW}{dg} = \frac{W}{2g} \quad (22)$$

This equation states simply that the precision of the instrument is determined by the precision with which the rotational speed can be measured. Thus, if a precision of measurement of $g$ to one part in 100 million is desired, the speed must be measured to an accuracy of ½ part in 100 million. Since this speed measurement is reduced to measurement of the frequency of an alternating current generator and precision in the order of one part in one thousand million is available from commercial laboratory instruments, such precision may be readily attained.

One means to obtain alternating currents of very precisely known frequency is shown schematically in FIGURE 4. Here a crystal controlled oscillator 18 with appropriate frequency division is used with an amplifier 19 to drive a synchronous motor 20 such as a hysteresis motor. This motor 20, in turn, drives the armature of a small alternator 21 through appropriate gearing. The frequency of this ultra stable system is chosen to produce a speed corresponding to some arbitrary reference value of gravity. An adjustable audio oscillator 22 with appropriate frequency division is used with a second amplifier 23 to drive a second synchronous motor 24. This motor 24, in turn, drives what is normally the stator of the small alternator through a gear train having a gear ratio as small as one millionth that of the first motor, for example. Thus, the output alternating voltage of the small alternator 21 is precisely related to the sum or the difference of the frequencies of the crystal oscillator 18 and the adjustable audio oscillator 22. The relative precision required of the two oscillators is the ratio of the fundamental crystal frequency to the audio frequency generated by the audio oscillator and the relative gear ratios. Thus, the precision required of the audio oscillator is of a low order.

The two driving motors may be arranged to drive the shaft of the sensitive element directly so that the alternator would be eliminated. A similar arrangement of one motor driving the stator of the other may be used or differential gearing may be employed.

Further, in actual practice, the entire system would be made automatic. Thus, the electrical signal from the sensitive element would be amplified and caused to operate an electric motor geared to control the frequency of the audio oscillator. With this closed loop arrangement, the frequency is automatically adjusted to maintain the sensitive element signal at zero and thus to automatically maintain the balance of torques acting on the pendulous assembly. Methods for this type of automation are in common usage today and need not be described in detail here.

The calibration of the system may now be derived. In the following, $W_0$ is used to indicate the nominal speed of the sensitive element as established by the crystal oscillator and $\Delta W$ is used to indicate the increase in speed established by the vernier control or auxiliary audio oscillator. Rewriting Equation 4 remembering that the deflection angle, $A$, is maintained at null or zero:

$$-M_2 R_2^2 W^2 \sin(2B) + M_1 R_1 g = 0 \quad (23)$$

$$g = \frac{M_2 R_2^2}{M_1 R_1} W^2 \sin(2B) \quad (24)$$

$$W = W_0 + \Delta W$$

$$g = g_0 + \Delta g$$

$$g_0 + \Delta g = \frac{M_2 R_2^2}{M_1 R_1} \sin(2B)(W_0^2 + 2W_0 \Delta W + \Delta W^2) \quad (25)$$

$$\Delta g = ng\ 10^{-6}$$

where $n$ may be as large as 1000 or as small as 1/100

$$\Delta g = \frac{M_2 R_2^2}{M_1 R_1} \sin(2B)(2W_0 \Delta W + \Delta W^2) \quad (26)$$

$$2W_0 \Delta W \gg \Delta W^2$$

$$\Delta g = 2\frac{M_2 R_2^2}{M_1 R_1} \sin(2B) W_0 \Delta W \text{ (approximately)} \quad (27)$$

It is important to note that even up to very large variations in gravity the calibration of the instrument is essentially linear. This is simply a result of the fact that the ratio of the change in speed to the nominal speed is very small.

FIGURE 5 illustrates schematically another mode of operation of the basic invention. In this mode of operation, the angle between the radius of the single unbalanced mass $M_1$ and the center line joining the two balanced masses $M_2$ is made 90° and the sensitive element is assembled so that the null position of the device corresponds to the physical position in which the radius of the unbalanced mass is vertical (coincident with the sensitive axis) with the unbalanced mass above the center line of the balanced masses.

By inspection of FIGURE 5 and using the quantities as defined in column 3, lines 2 through 7, the equation of motion of the pendulous assembly of this embodiment are derived in the following:

For convenience, the additional definitions are made:

$I=$ Moment of inertia of the pendulous assembly for angular motion about the pendulous axis.
$C=$ Coefficient of damping as determined by the geometry of the float and the case and the viscosity of the flotation fluid such that the product $dD/dt$ is the viscous damping torque.
$D=$ Displacement angle in radians between the sensitive axis and the radius of the asymmetric pendulum.
$D = 90 - A$.

By d'Alembert's principle, the sum of the torques acting on the central assembly must be zero. The sum of the moments is:

$$M_1 g R_1 \sin D + M_1 R_1 \sin D W^2 R_1 \cos D$$
$$- 2M_2 R_2 \cos D W^2 R_2 \sin D - KD$$
$$- C\frac{dD}{dt} - I\frac{d^2 D}{dt^2} = 0 \quad (28)$$

Recall the identity:

$$2 \sin \lambda \cos \lambda = \sin 2\lambda$$

And for very small angles:

$$\sin \lambda \approx \lambda$$
$$\sin 2\lambda \approx 2\lambda$$

$$I\frac{d^2 D}{dt^2} + C\frac{dD}{dt} + (K + 2M_2 R_2^2 W^2 - M_1 R_1^2 W^2 - M_1 g R_1)D = 0 \quad (29)$$

This second order differential equation is that of an oscillatory system having a natural frequency of:

$$W_n = \sqrt{\frac{K + 2M_2 R_2^2 W^2 - M_1 R_1^2 W^2 - M_1 g R_1}{I}} \quad (30)$$

or a natural period of:

$$T_n = \frac{2\pi}{W_n} = 2\pi \sqrt{\frac{I}{K + 2M_2 R_2^2 W^2 - M_1 R_1^2 W^2 - M_1 g R_1}} \quad (31)$$

Thus, if the speed, $W$, is adjusted so that $W_n$ is real, the central assembly will oscillate when disturbed and damp or settle to a position with $D=0$. If the speed $W$ is adjusted so that $W_n = 0$, the assembly will experience no net torque and will rest at any set position. Under this adjustment, if $g$ is increased ever so slightly, the central assembly will rotate continuously until it hits mechanical stops (not shown). This is the condition of infinite sensitivity.

This mode of operation has the advantage that, in the null position, the pendulous assembly is completely balanced with respect to the sensitive axis so that there is no net force tending to move the entire assembly off center. Thus, the effect of the fluid in the rotating field is to keep the float assembly precisely at the center of rotation.

The device of this invention thus produces an instrument for the measurement of the acceleration of gravity which is hermetically sealed with remote electrical indication of the measurement, unusual sensitivity over a greatly extended total dynamic range, with the measurement made from the frequency of an alternating voltage of rotational speed to great precision, and of rugged design readily portable and adapted to extended use in the field with infrequent recalibration. While the above description discloses a limited number of embodiments of the device of this invention, it is possible to produce still other embodiments without departing from the spirit thereof, and it is desired, therefore, that only such limitations shall be imposed upon the appended claims as are stated therein or required by the prior art.

What I claim is:

1. In an instrument for the precise measurement of the acceleration of gravity means including a pendulous element constrained to a pivot axis and maintained at near neutral buoyancy in a fluid, said pendulous element having means including an arrangement of three co-planar concentrations of mass, two of said concentrations of masses being on the same center line through and balanced about the pivot axis of said pendulous element and a third mass being on a radius through said pivot axis intersecting the center line of said balanced pair of masses, means to rotate said pendulous element together with a case containing said supporting fluid about an axis normal to said pivot axis, means to precisely control and indicate remotely the rotational speed so that the force of gravity may be inferred precisely from the rotational speed required to maintain said pendulous element in its neutral position relative to said axis of rotation, said axis of rotation being aligned generally along the local vertical.

2. A device for measuring gravitational force or variations therein by means of an assembly arranged for rotation about an axis, said assembly mounting an element, said element being made integral with a float, said element and float being surrounded by a case, a fluid contained by said case so that said element and float are supported approximately at neutral buoyancy, and being arranged to have limited freedom to rotate about another axis perpendicular to the axis of rotation, said element having three centers of mass, two of said centers of mass disposed so that the torques resulting from gravitational force on said two centers of mass are balanced yet the centrifugal force resulting from rotation produces a torque about the axis of limited freedom, the third center of mass is unbalanced and arranged so that an opposing torque results from the gravitational force acting on said unbalanced mass; means to indicate externally rotation of said element about said perpendicular axis, and means for precision control and adjustment of the speed of rotation of said assembly.

3. A device for measuring gravitational force or variations therein by means of an assembly arranged for rotation about an axis, said assembly mounting an element, said element being made integral with a float, said float assembly being surrounded by a case, a fluid contained by said case so that said float assembly is supported approximately at neutral buoyancy, and being arranged to have limited freedom to rotate about another axis perpendicular to the axis of rotation, said element having three centers of mass, two of said centers of mass disposed so that the torques resulting from gravitational force on said two centers of mass are balanced yet the centrifugal force resulting from rotation produces a torque about the axis of limited freedom, the third center of mass is unbalanced and arranged so that an opposing torque results from the gravitational force acting on said unbalanced mass, means including an electrical signaling device and slip rings on the axis of rotation to indicate externally rotation of said element with respect to said axis of rotation; and means for precision control and adjustment of the speed of rotation of said assembly.

4. A device for measuring gravitational force or variations therein by means of an assembly arranged for rotation about an axis, said device including, in combination with said assembly, a fluid-containing case surrounding said assembly, means floating in the fluid of said case for supporting said assembly at approximately neutral buoyancy, and with limited freedom to rotate about another axis perpendicular to the axis of rotation, an element mounted within said assembly, said element having three centers of mass, two of said centers of mass disposed so that the torques resulting from gravitational force on said two centers of mass are balanced yet the centrifugal force resulting from rotation produces a torque about the axis of limited freedom, the third center of mass is unbalanced and arranged so an opposing torque results from the gravitational force acting on said unbalanced mass; means to indicate externally rotation of said element away from its normal position with respect to the axis of rotation; and means for precision control and adjustment of the speed of rotation of said assembly, including coupling to a synchronous motor supplied current from an alternating current generator the frequency of which is adjustable, highly stable, and accurately calibrated.

References Cited by the Examiner

UNITED STATES PATENTS

| 2,319,940 | 5/43 | Marrison | 73—382 |
| 2,573,494 | 10/51 | Rosenberg | 290—5 |
| 2,732,717 | 1/56 | Rothacker | 73—382 |
| 3,014,374 | 12/61 | Johnston | 73—517 |
| 3,041,883 | 7/62 | Aske et al. | 73—517 X |

FOREIGN PATENTS

| 3353/31 | 8/32 | Australia. |

RICHARD C. QUEISSER, *Primary Examiner.*

D. SCHONBERG, *Examiner.*